United States Patent [19]

Tomiwa

[11] 3,781,976

[45] Jan. 1, 1974

[54] METHOD OF MANUFACTURING CHIP-SHAPED SOLID STATE ELECTROLYTIC CAPACITORS

[75] Inventor: Hiroshi Tomiwa, Osaka, Japan

[73] Assignee: Matsuo Electric Company, Limited, Osaka-fu, Japan

[22] Filed: May 8, 1972

[21] Appl. No.: 251,304

[30] Foreign Application Priority Data

May 26, 1971 Japan ................................ 46/36151
July 19, 1971 Japan ................................ 46/53780

[52] U.S. Cl. ......................... 29/583, 29/588, 29/591
[51] Int. Cl. ............................................. B01j 17/00
[58] Field of Search .................. 29/576 S, 588, 591, 29/583, 626, 627

[56] References Cited

UNITED STATES PATENTS 3,391,456 7/1968 Gannoe ............................ 29/576 S
3,618,200 11/1971 Matsuo ................................ 29/588
3,707,766 1/1973 Veith .................................. 29/588

*Primary Examiner*—Charles W. Lanham
*Assistant Examiner*—W. C. Tupman
*Attorney*—Eugene E. Geoffrey, Jr.

[57] ABSTRACT

A method for manufacturing chip-shaped capacitor elements wherein a terminal array is formed within a rectangular frame with the terminals being arranged in rows and columns and held by supporting members. Capacitor elements with lead conductors are bonded to the terminals and then each row of capacitors is enclosed within a synthetic resin. The molded rows of capacitors are then severed from the frame and supporting members and the individual capacitors are then cut from said molded rows of capacitors.

3 Claims, 13 Drawing Figures

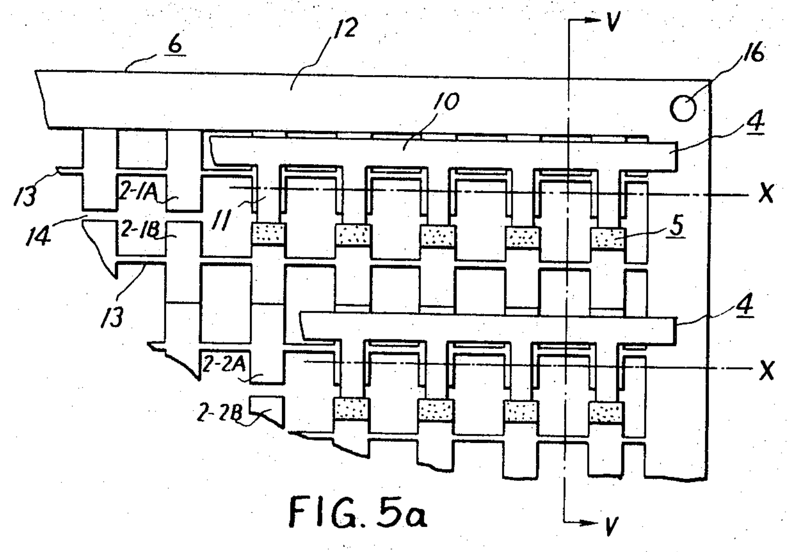
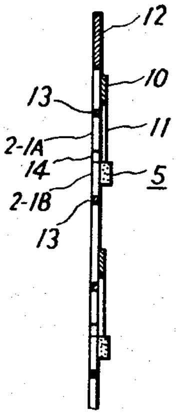
FIG. 5a FIG. 5b
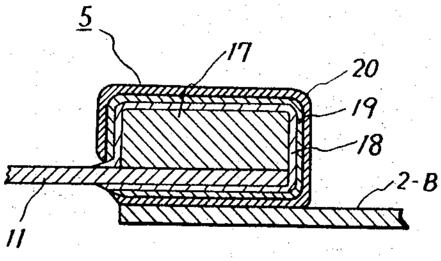
FIG. 6
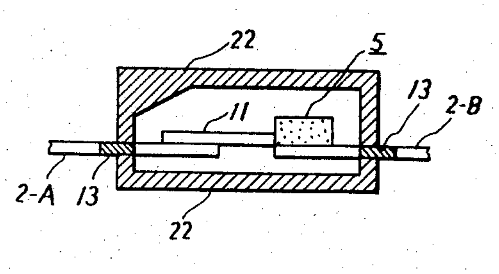
FIG. 9
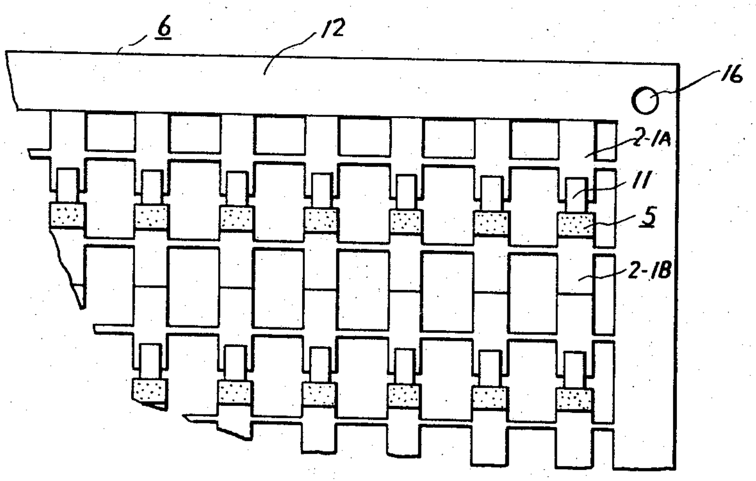
FIG. 7

METHOD OF MANUFACTURING CHIP-SHAPED SOLID STATE ELECTROLYTIC CAPACITORS

This invention relates to an improved method of manufacturing chip-shaped solid state electrolytic capacitors each being enclosed in a resin and having a pair of electrode terminals extending therefrom.

With development of integrated circuits, the demand for miniature resin-molded capacitors has increased substantially. However, such miniature capacitors require specially designed precise jigs and tools as well as great skill in manufacture and, therefore, have not been generally mass produced. Accordingly, they have generally been expensive and non-uniform in geometric quality.

Therefore, an object of this invention resides in the provision of an improved method which can be applied to mass production and enable the manufacture of high quality miniature electrolytic capacitors at low cost.

According to this invention, this object is attained by using a method comprising the steps of preparing a terminal array including a plurality of pairs of electrode terminals arranged in rows and columns, said terminals being connected through connecting members and fixed in place on a supporting frame, bonding capacitor elements respectively to said pairs of electrode terminals, embedding said capacitor elements in resin together at each row, cutting off said support frame and connecting members to obtain trains of capacitors each comprising a plurality of capacitor elements embedded together in a single continuous resin package and corresponding pairs of electrode terminals extending from said package, and separating said capacitors individually by cutting said package at their boundaries.

Other objects and features of this invention will be described in detail hereinunder with reference to the accompanying drawings.

In the drawings:

FIG. 1 is a perspective view representing a typical example of the chip-shaped solid state electrolytic capacitor which is suitable for manufacture in accordance with this invention;

FIG. 2(1) to 2(3) are side views representing three variations of the capacitor of FIG. 1;

FIG. 5(1) is a partial plan view representing a step of the method of this invention;

FIG. 5(2) is a cross-section view taken along the line V—V of FIG. 5(1);

FIG. 6 is an enlarged cross-sectional view of a capacitor element bonded to a terminal;

FIG. 7 is a partial plan view representing another step of the method of this invention;

FIG. 8(2) is a cross-section taken along the line VIII—VIII of FIG. 8(1);

FIG. 9 is a partial sectional view representing a capacitor element assembly of FIG. 7 covered by a metal mold in accordance with a preferred embodiment of this invention;

Figure 10A:
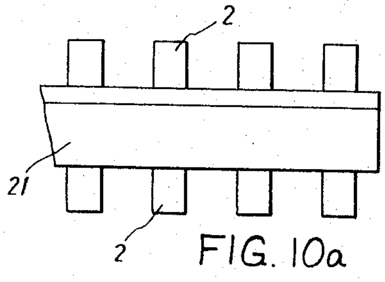
Figure 10B:
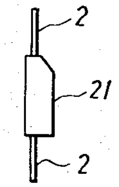
Figure 11A:
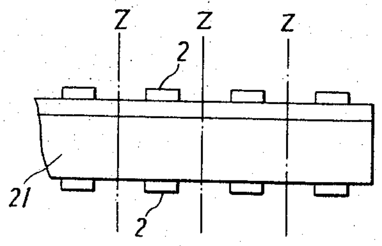
Figure 11B:
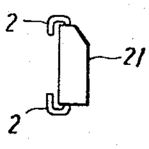
Figure 12:
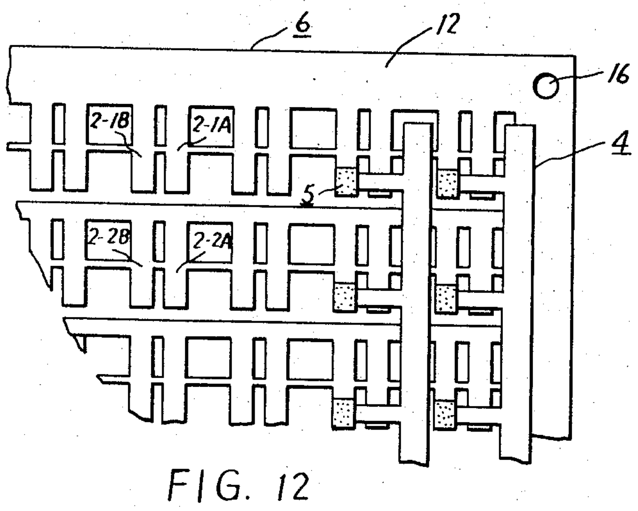
Figure 13:
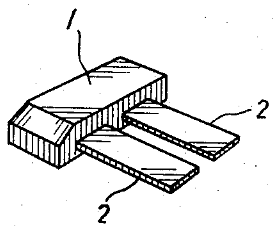

FIGS. 10(1) and 10(2) are partial plan and side views representing a still further step of the method of this invention;

FIGS. 11(1) and 11(2) are partial plan and side views representing a still further step of the method of this invention;

FIG. 12 is a partial plan view representing a modification of this invention; and FIG. 13 is a perspective view of a capacitor produced by the modification of FIG. 12.

Throughout the drawings, like reference numerals are used to denote like components.

Figure 1:
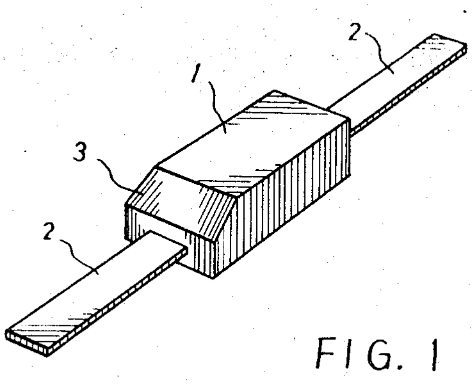
Figures 2A, 2B, 2C:
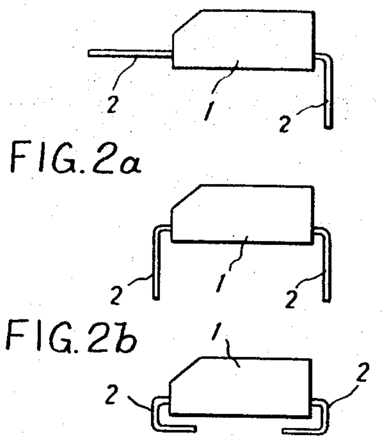

Referring to FIG. 1 representing an example of a chip-shaped solid state electrolytic capacitor made by a method of this invention, the capacitor consists of a main body 1 having resin enclosure and a pair of electrode terminals 2 extending from opposite sides thereof. FIGS. 2(1) to 2(3) show three variations of the capacitor of FIG. 1, produced by bending the electrode terminals 2 in accordance with another method of this invention.

Figure 3:
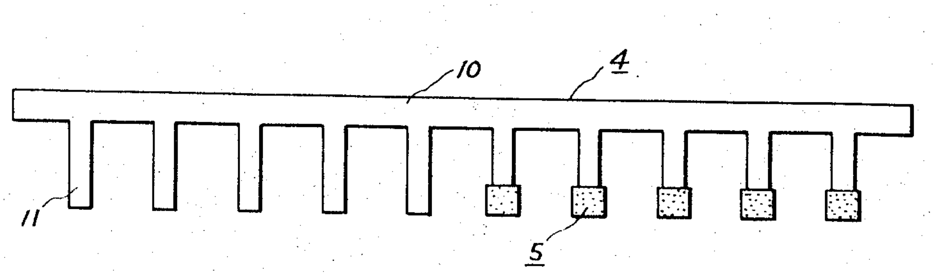
FIG. 3 is a plan view representing an example of comb-plate used in the process of this invention.

Referring next to FIG. 3 showing a typical example of comb-plate 4 which consists of a supporting bar 10 and a plurality of lead conductors 11 extending from one side of the bar 10. The bar 10 and conductors 11 are punched or etched from a sheet of metal, such as tantalum, titanium, niobium or aluminum, which will form an oxide layer. On the top of each lead conductor 11 is a previously formed capacitor element 5 which will be described in detail later in conjunction with the structure of FIG. 6.

Figure 4:
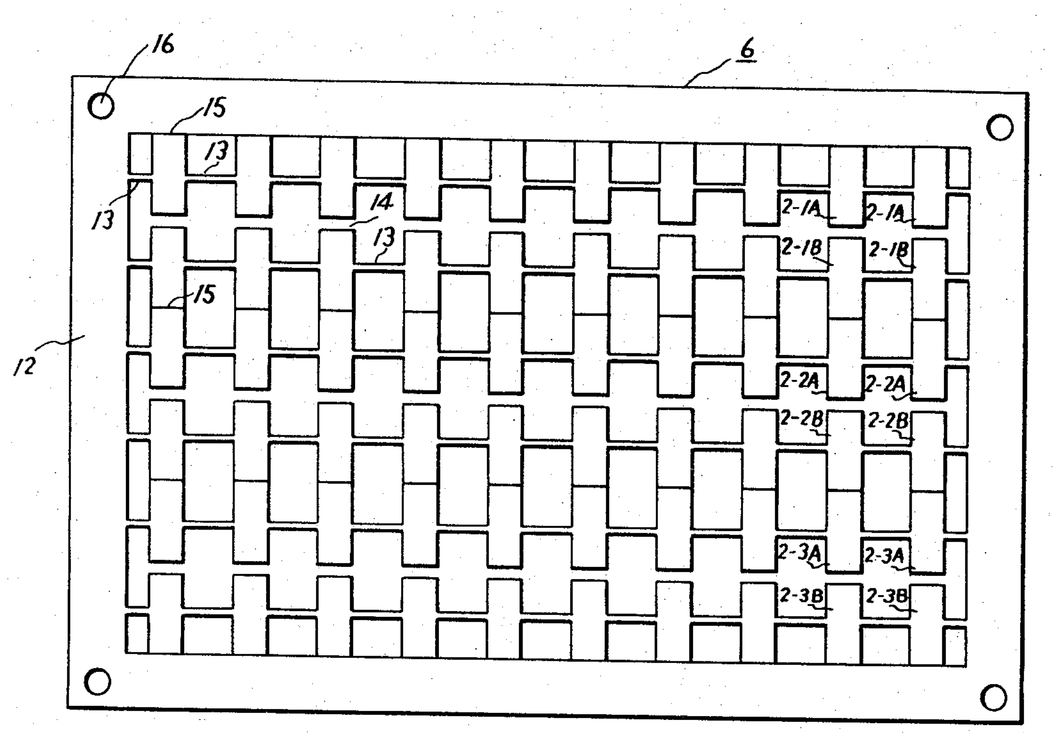
FIG. 4 is a plan view representing a typical example of the terminal array used with the comb-plate of FIG. 3.

FIG. 4 shows a typical embodiment of the terminal array 6 used for execution of the method of this invention. It is preferably made from a sheet of weldable and solderable metal such as nickel, iron, copper or Kovar by means of punching or etching and includes a square terminal frame 12 and a plurality of rectangular electrode terminals 2 arranged in rows and columns. The electrode terminals 2 consist of a plurality of pairs of positive and negative terminals 2-A and 2-B which are arranged in facing relationship with spaces 14 therebetween, and these pairs are divided into several groups. The groups of the electrode terminals are arranged in rows so that the first row includes the first group of terminals 2-1A and 2-1B, the second row includes the second group of terminals 2-2A and 2-2B, the third row includes the third group of terminals 2-3A and 2-3B and so on. Thus, in the embodiment of FIG. 4, the pairs of electrode terminals 2 are arranged in three rows and 10 columns as an example. It should be noted that the number of rows or columns can be arbitrarily selected as occasion demands. The positive electrode terminals 2-1A in the first row and the negative electrode terminals 2-3B in the last row are connected integrally to the terminal frame 12 and the adjoining electrode terminals, e.g. 2-1B and 2-2A, in the adjoining rows are respectively connected integrally with each other. The electrode terminals 2 in the same rows are coupled through thin connecting members 13 to each other and to the frame 12 so that the electrode terminals 2 are fixed in place in the array. Notches 15 may be formed between the electrodes and between the electrodes and frame 12 as shown in order to facilitate separation to be effected later. In the four corners of the frame 12 are holes 16 which are used as pilot holes for precisely positioning the frame 16. The intervals between the electrode terminals 2 in each row are made precisely equal to the intervals between the lead conductors 11 of the comb-plate 4.

Now, the steps of the present method will be described with reference to FIGS. 5 through 13.

As shown in FIG. 5, a comb-plate 4 having capacitor elements 5 is put on each row of pairs of electrode terminals so that the capacitor elements 5 are placed respectively on the negative electrode terminals and the lead conductors 11 are placed on the corresponding positive electrode terminals respectively. In this state, the capacitor elements 5 and the lead conductors 11 of the comb-plate 4 are respectively welded or soldered to the corresponding electrode terminals of the terminal array 6. Then, the lead conductors 11 of each comb-plate 4 are cut along the line X in FIG. 5 to remove the supporting bar 10 as shown in FIG. 7.

The capacitor element 5 and its connection to the electrode terminal 2-B is shown in the enlarged sectional view of FIG. 6. The capacitor element 5 includes an anode block 17 welded to the top of the lead conductor 11 of the comb-plate and consists of a metal, such as tantalum, titanium, niobium or aluminum, which is the same as the lead conductor 11 and is capable of forming an oxide layer. The anode block 17 is preferably made of sintered metal particles but it may be made appropriately from wire, sheet or foil of the metal. The element 5 further includes an oxide layer 18, a semi-conductor layer 19 and a cathode layer 20 which are formed successively on the surface of the block 17. The technique of forming these layers is well known in the art and further description is not deemed necessary. The cathode layer 20 is preferably soldered to the cathode electrode terminal 2-B by putting a solder pellet therebetween and heating the assembly in an electric or infrared ray oven.

Then, the lead conductors 11 of each comb-plate 4 are cut along each line X in FIG. 5 to remove the supporting bars 10 therefrom as shown in FIG. 7.

Figure 8A:
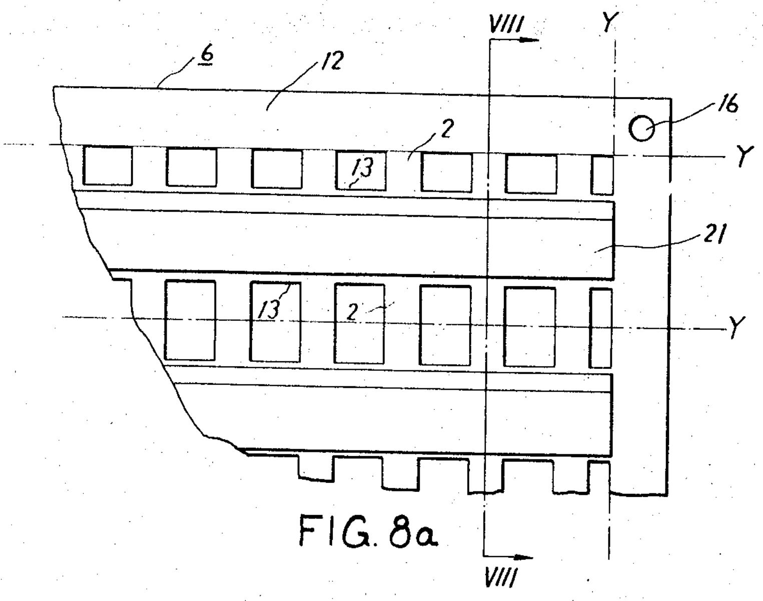
FIG. 8(1) is a partial plan view representing a further step of the method of this invention.
Figure 8B:
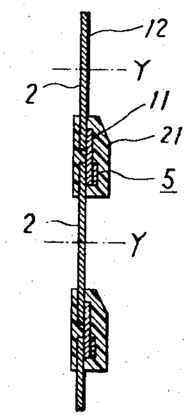

In the next step, the capacitor elements 5 with the lead conductors 11 are provided with metal molds and molded with an appropriate synthetic resin casting material by a transfer molding technique, for example. This molding is executed at every row to form a single resin package 21 for each row as shown in FIG. 8. As shown in the drawing, the capacitor elements 5 and their lead conductors 11 are completely embedded in the resin package 21 so that both electrode terminals 2 extend out from opposite sides of the package 21. As the resin package 21 is fully continuous throughout the whole length, it is unnecessary to provide the metal mold with discrete cavities for the respective capacitors. Moreover, if the connecting members 13 are previously designed so that their side faces facing the package 21 are located in the same planes as the side faces of the package, that is, as the inner faces of the metal mold 22 as shown in FIG. 9, the connecting members 13 can serve to block the casting resin and permit further simplification of the metal mold. These features result in significant reduction in cost for fabricating the metal mold. A taper 11 of the resin package 21 is provided for denoted the anode electrode terminal.

The electrode terminals 2 are then cut along lines Y and, thereafter, or at the same time, the connecting members 13 are also cut away. Thus, a train of capacitors is obtained as shown in FIG. 10, provided with a single resin package 21 containing 10 capacitors in this embodiment. The electrode terminals 2 extending from both ends of the train of capacitors are then bent or folded into a predetermined shape at the same time by using appropriate jigs and tools, as shown in FIG. 11. Thereafter, the respective capacitors are separated by cutting the train along the lines Z in FIG. 11. It is of course evident that the terminal bending step would be omitted when straight terminals are required for the completed capacitor. If necessary, testing and aging steps may be carried out before separation.

Though the description has been made heretofore in conjunction with capacitors having a pair of electrodes extending from both sides thereof, capacitors having a pair of electrodes extending from one side thereof can be made in accordance with this invention by slightly changing the shape of the terminal array 6 and the orientation of the comb-plates 4 as shown in FIG. 12. It should be understood that the arrangement of FIG. 12 would produce capacitors having an appearance which includes a pair of electrode terminals 2 extending from one side of the body 1 as shown in FIG. 13. Moreover, though rectangular electrode terminals 2 are only shown in the drawings, any shape of terminal can be obtained by previously shaping the terminals 2 on the terminal array 6 as desired.

As described in the above, in accordance with this invention, the process of manufacture of chip-shaped solid state electrolytic capacitors can be highly simplified and suited for mass production and, therefore, the cost of manufacture can be substantially reduced.

What is claimed is:

1. The method of manufacturing chip-shaped solid state electrolytic capacitors by using capacitor elements formed respectively on the tops of comb-like lead conductors, comprising the steps of preparing a terminal array including a plurality of electrode terminals arranged in rows and columns, said terminals being connected sequentially through connecting members and fixed in place on a supporting frame, placing said capacitor elements and comb-like lead conductors respectively on said pairs of electrode terminals and bonding them with each other, covering said capacitor elements in each row with a single metal mold and injecting a synthetic resin material into said metal mold to embed said capacitor elements in a single resin package, cutting off said support frame and said connecting members to obtain a train of capacitors from said each row, said train including a plurality of capacitors each having a pair of electrode terminals extending outwardly from said resin package, and separating said capacitors by cutting said train.

2. The method according to claim 1 wherein said electrode terminals extending from said resin package are simultaneously bent into a predetermined shape before said separating step.

3. The method according to claim 1 wherein the side faces of said connecting members facing said packages are in the same planes as the side faces of said packages, whereby said connecting members serve the function of a part of said metal mold.

* * * * *